Figure 1:
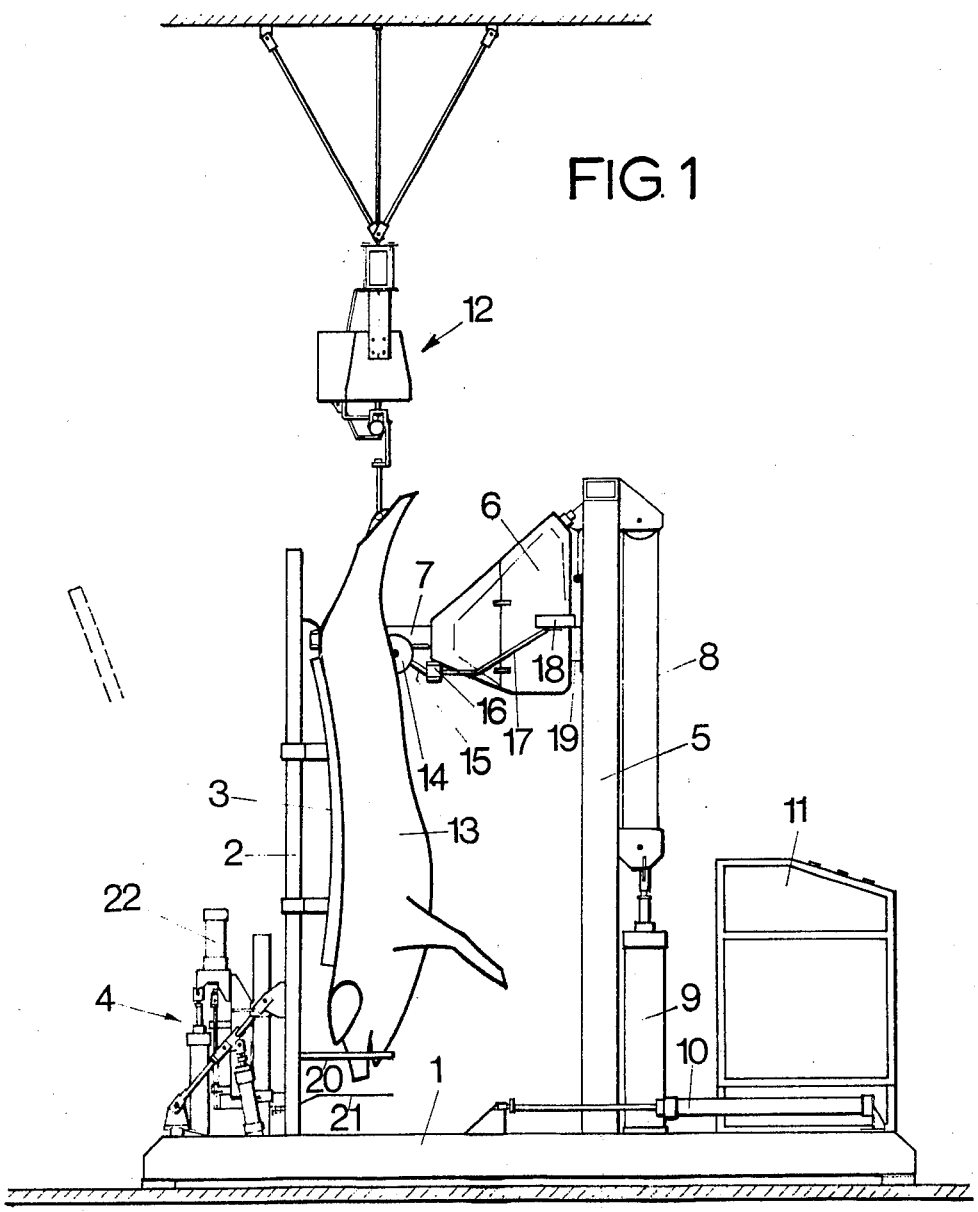

United States Patent [19]
Kvilhaug

[11] 3,916,482
[45] Nov. 4, 1975

[54] DEVICE FOR CLEAVING OF CARCASSES OF SLAUGHTERED ANIMALS

[76] Inventor: Vermund Kvilhaug, Gragasveien 17, 3140 Borgheim, Norway

[22] Filed: Jan. 30, 1974

[21] Appl. No.: 438,118

[52] U.S. Cl. .................................. 17/23; 83/368
[51] Int. Cl.² .......................................... A22B 5/20
[58] Field of Search .................. 17/23, 52, 44.2, 54; 30/308, 289; 83/368

[56] References Cited
UNITED STATES PATENTS

| | | | |
|---|---|---|---|
| 556,956 | 3/1896 | Boyd | 17/23 |
| 2,634,457 | 4/1953 | Moyer | 17/23 |
| 3,095,602 | 7/1963 | Kohner | 17/23 |
| 3,402,425 | 9/1968 | Wexel | 17/23 |
| 3,402,426 | 9/1968 | Wexel | 17/23 |
| 3,533,131 | 10/1970 | Ivarsson | 17/23 |
| 3,599,277 | 8/1971 | Brown | 17/52 |
| 3,641,624 | 2/1972 | Aubert | 17/23 |
| 3,829,932 | 8/1974 | Griss | 17/23 |

FOREIGN PATENTS OR APPLICATIONS

| | | | |
|---|---|---|---|
| 480,802 | 12/1969 | Switzerland | 17/23 |

*Primary Examiner*—Robert Peshock
*Assistant Examiner*—James D. Hamilton
*Attorney, Agent, or Firm*—Sughrue, Rothwell, Mion, Zinn & Macpeak

[57] ABSTRACT

A device for cleaving carcasses of slaughtered animals, consisting of a sword-like tool carrying out chopping, cleaving strokes along the middle plane of the backbone of the carcass, the cleaving tool being, through a servo controller, guided by a pair of castors following either side of the backbone so as to move along the middle plane of said backbone even when same is more or less distorted.

4 Claims, 3 Drawing Figures

DEVICE FOR CLEAVING OF CARCASSES OF SLAUGHTERED ANIMALS

The present invention relates to a device for cleaving of carcasses of slaughtered animals, especially pig carcasses, by chopping, cleaving strokes with a sword-like tool which parts the carcass, after the belly having been cut open in its longitudinal direction and the entails been removed, in two symmetrically equal halves, by which the backbone of the carcass is cleaved in the longitudinal direction, which tool is fixed to and protrudes from one end of a housing which comprises power transferring means which applies chopping movements to the tool and which thereby is moved downwardly along a vertical post, the carcass being supported by a stand which keeps the carcass in vertical position during the cleaving operation.

Cleaving devices of the above mentioned kind are previously known, but they suffer from the disadvantage that the cleaving tool does not exactly follow the middle plan of the carcass in such cases in which the backbone is distorted, so that bone splinters are freed which may, in case, stick to the flesh and reduce the quality of same, the carcass being substantially not cleaved exactly along its middle plan.

These disadvantages are avoided by means of the invention, the characterizing feature of which being that the housing carries a pair of free rotating casters which are arranged for contacting each side of the inner side of the backbone of the carcass to follow same, and via a servo controller bring the tool to move along the middle plan of the backbone which coincides with the distorted parting plane, said cutting tool being turnably arranged about a horizontal axis which substantially coincides with its edge.

Figure 2:
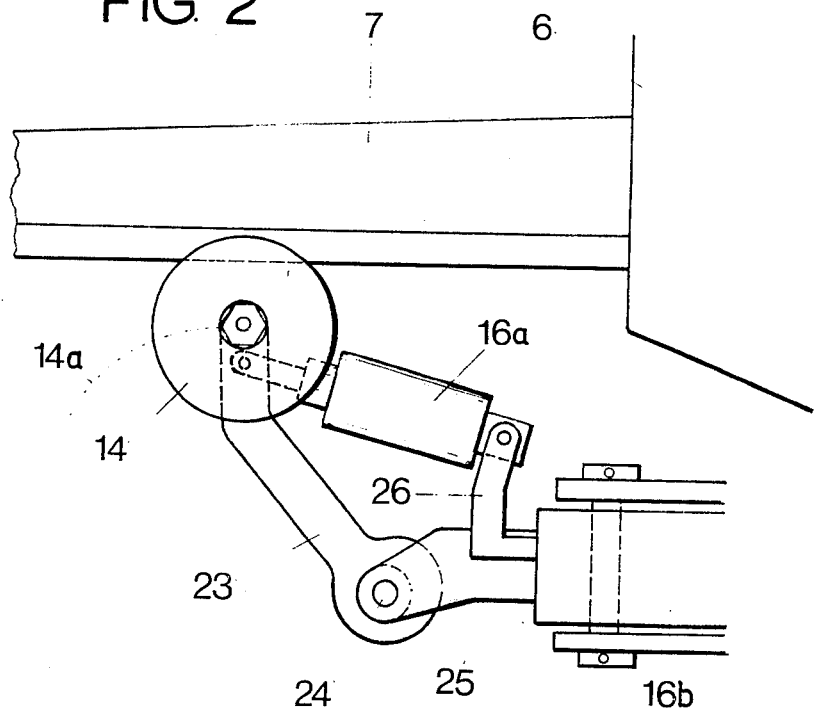
Figure 3:
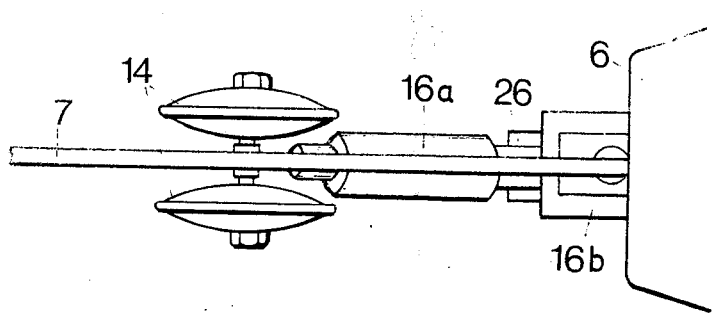

The invention is to be explained with reference to the drawings, of which:

FIG. 1 shows diametrically in elevation an example of a device for cleaving carcasses of slaughtered animals, and FIGS. 2 and 3 show the casters with the sword in elevation and in bottom view, respectively.

The device comprises a fundament 1 from which protrudes a pair of vertical posts 2 which, together with a cradle 3, form a supporting stand for a carcass 13. The cradle consists of two cups which substantially follow the back of the carcass at each side of the backbone to support the carcass during the cleaving operation. In FIG. 1, an hydraulic or pneumatic means is designated by 4 and having transmission links which are used to swing the posts 2 with the cradle 3 to a left position, as indicated in FIG. 1 by dotted lines, in order to allow the carcass 13 to be brought in position when same arrives suspended on hooks which are moved along a conveyor, which is designated by 12 and which is not to be described in detail. Said conveyor moves the carcass in the direction perpendicularly to the plane of the drawing.

From said fundament 1 also protrudes a vertical post 5 along which a housing 6 may be moved up and down. From the left side of said housing 6 there protrudes a sword-like cleaving tool 7. On the other side of said post 5 there is arranged an hydraulic cylinder 9, the piston rod of which is coupled with a cord drive 8, by means of which the housing 6 may be moved up and down along guides on said post 5. The post 5 and cylinder 7 are movable in direction to and from the posts 2 by means of an hydraulic cylinder 10.

As shown in FIGS. 2 and 3 just below the sword 7 there is arranged a pair of casters 14 which are freely rotating on a pin 14a fixed to the free end of an arm 23 which is turnable about a pin 24 by means of which said arm 23 is linked to an arm 25 which acts on an hydraulic valve 16b when arm 23 is acted upon under the influence of the pair of casters 14 which react on distortions in the backbone of the carcass of the inner side of the abdominal cavity. Simultaneously, said arm 23 and, consequently, the pair of casters are, influenced by an hydraulic cylinder 16a which causes the pair of casters 14 to be constantly kept in engagement with the backbone, the center of the pair of casters being moved along an arch 14a having its center in the pin 24. When the casters 14, due to distortion of the backbone, are swung to one side, this movement is transferred to the arm 25 which is turned and via valve 16b causes a control impulse transferred via tube 17 (FIG. 1) to an hydraulic control member 18 which again causes the sword housing 6 to be turned corresponding to the inclined position in which the pair of casters 14 has been brought. Since the housing 6 it turned together with the edge of the sword 7 as a center line, the sword will always be forced to follow the middle plane of the backbone and, thus, part the backbone and, consequently, the carcass along a cut which comprises said middle plane.

When the carcass 13 is suspended as shown and with its back resting against the cradle 3, the belly is kept open by abdominal cups, not shown. Simultaneously, the nose of the carcass is gripped by a gripping device 20 which is controlled by a pneumatic cylinder 22, the operation of which is terminated when the tip of the nose touches a plate 21. Said plate may via a servo control start the cutting operation of the sword 7 as well as the downward movement of the housing 6.

The casters 14 are preferably wedge-shaped so that they will be influenced upon by the backbone axis-parallelly as well as radially so that they can transfer components of control impulses to the servo control, which components are at right angle to each other.

The reason why the edge of the sword is brought to follow the middle plan of the carcass is that the distortions of the backbone only amount to 1 to 2 millimeters, and, simultaneously, the stroke of the sword at the place of cutting is 2 to 3 millimeters.

After the cleaving operation has been terminated, the two halves of the carcass will be transported by the conveyer away from the cleaving device and, simultaneously, a new carcass being brought in position.

I claim:

1. In a device for cleaving of carcasses of slaughtered animals, especially pig carcasses, by chopping, cleaving strokes with a sword like tool which parts the carcass, after the belly having been cut open in its longitudinal direction and the entrails having been removed, in two symmetrically equal halves, by which the backbone of the carcass is cleaved in the longitudinal direction, which tool is fixed to and protrudes from one end of the housing which comprises power transferring means which applies chopping movements to the tool and which thereby is moved downwardly along a vertical post, the carcass being supported by a stand which keeps the carcass in vertical position during the cleaving operation, the improvement comprising: the housing carrying a pair of free rotating casters which are arranged for contacting each side of the inner side of the backbone of the carcass to follow same, and a servo controller coupled to said casters to bring the tool to move along the middle plane of the backbone which coincides with the distorted parting plane by turning said cutting tool about a horizontal axis which substantially coincides with its edge.

2. The device as claimed in claim 1, in which the servo controller also serves to keep the pair of casters in engagement with the backbone with a certain pressure, the casters being wedge-shaped so that they may be influenced by the backbone axis-parallelly as well as radially so as to be able to transfer to the servo control components of control impulses in right angle to each other.

3. The device as claimed in claim 1, including a stretching means consisting of a gripping means which grips and retains the nose of the carcass, and a pneumatic or hydraulic cylinder which, via the gripping means, keeps the carcass stretched during the cleaving operation.

4. The device as claimed in claim 3, in which a plate against which the nose of the carcass is moved by the stretching means, stops said movement simultaneously starts the cleaving operation.

* * * * *